United States Patent
Cho et al.

(10) Patent No.: US 9,769,802 B2
(45) Date of Patent: Sep. 19, 2017

(54) METHOD AND APPARATUS FOR REGISTERING ACCESS POINT THROUGH WIFI NETWORK BY USING INFORMATION OBTAINED FROM COMMON DEVICE IN CELLULAR-WIFI CONVERGENCE SYSTEM

(71) Applicant: LG ELECTRONICS INC., Seoul (KR)

(72) Inventors: Heejeong Cho, Seoul (KR); Eunjong Lee, Seoul (KR); Hyeyoung Choi, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/443,309

(22) PCT Filed: Jul. 10, 2013

(86) PCT No.: PCT/KR2013/006160
§ 371 (c)(1),
(2) Date: May 15, 2015

(87) PCT Pub. No.: WO2014/084475
PCT Pub. Date: Jun. 5, 2014

(65) Prior Publication Data
US 2015/0296496 A1    Oct. 15, 2015

Related U.S. Application Data

(60) Provisional application No. 61/730,457, filed on Nov. 27, 2012.

(51) Int. Cl.
*H04W 72/04* (2009.01)
*H04W 48/14* (2009.01)
*H04W 48/16* (2009.01)

(52) U.S. Cl.
CPC ....... *H04W 72/0406* (2013.01); *H04W 48/14* (2013.01); *H04W 48/16* (2013.01)

(58) Field of Classification Search
None
See application file for complete search history.

(56) References Cited

U.S. PATENT DOCUMENTS

2007/0171881 A1    7/2007 Zhang et al.
2007/0208937 A1*   9/2007 Cam-Winget ........ H04L 9/0844
                                                       713/168

(Continued)

FOREIGN PATENT DOCUMENTS

GB       2489751 A      10/2012
JP    2011521532 A       7/2011

(Continued)

OTHER PUBLICATIONS

PCT International Application No. PCT/KR2013/006160, Written Opinion of the International Searching Authority dated Aug. 30, 2013 1 page.

(Continued)

*Primary Examiner* — Hassan Kizou
*Assistant Examiner* — Deepa Belur
(74) *Attorney, Agent, or Firm* — Lee, Hong, Degerman, Kang & Waimey (57) ABSTRACT

The present invention relates to a method and apparatus for registering an access point through a WiFi network using information obtained from a common device in a cellular-WiFi convergence system. The present invention provides a method in which a sub-RAT system entity obtains main RAT system information through a common device and a WiFi network thereof in a communication system in which a (Continued)

cellular system and a WiFi system are converged, and notifies a managing device of information thereon through the WiFi network.

3 Claims, 9 Drawing Sheets

(56) References Cited

U.S. PATENT DOCUMENTS

| | | | | |
|---|---|---|---|---|
| 2009/0047950 A1* | 2/2009 | Doppler | ................ | H04W 48/14 |
| | | | | 455/435.1 |
| 2009/0274069 A1 | 11/2009 | Olsson et al. | | |
| 2010/0003980 A1 | 1/2010 | Rune et al. | | |
| 2012/0324100 A1* | 12/2012 | Tomici | ................ | H04L 45/123 |
| | | | | 709/224 |
| 2013/0250905 A1* | 9/2013 | Lee | ................ | H04W 48/18 |
| | | | | 370/329 |
| 2013/0316705 A1* | 11/2013 | Kneckt | ................ | H04L 67/16 |
| | | | | 455/435.1 |
| 2014/0185487 A1* | 7/2014 | Cho | ................ | H04W 8/005 |
| | | | | 370/254 |
| 2015/0319672 A1* | 11/2015 | Hedberg | ................ | H04W 48/06 |
| | | | | 370/338 |
| 2015/0350961 A1* | 12/2015 | Cho | ................ | H04W 48/14 |
| | | | | 455/436 |
| 2017/0034704 A1* | 2/2017 | Jin | ................ | H04W 12/08 |

FOREIGN PATENT DOCUMENTS

| | | | | |
|---|---|---|---|---|
| JP | 2011-151801 | | 8/2011 | |
| JP | 2011527136 A | | 10/2011 | |
| KR | 10-2011-0081101 | | 7/2011 | |
| KR | 10-2012-0035871 | | 4/2012 | |
| WO | WO 2014008605 A1 * | | 1/2014 | ............ H04W 4/001 |

OTHER PUBLICATIONS

Japanese Patent Office Application No. 2015-543951 Office Action dated May 10, 2016, 3 pages.

European Patent Office Application No. 13859558.2, Search Report dated Jun. 20, 2016, 10 pages.

* cited by examiner

METHOD AND APPARATUS FOR REGISTERING ACCESS POINT THROUGH WIFI NETWORK BY USING INFORMATION OBTAINED FROM COMMON DEVICE IN CELLULAR-WIFI CONVERGENCE SYSTEM

CROSS-REFERENCE TO RELATED APPLICATIONS

This application is the National Stage filing under 35 U.S.C. 371 of International Application No. PCT/KR2013/006160, filed on Jul. 10, 2013, which claims the benefit of U.S. Provisional Application No. 61/730,457, filed on Nov. 27, 2012, the contents of which are all hereby incorporated by reference herein in their entirety.

BACKGROUND OF THE INVENTION

Field of the Invention

The present invention relates to wireless communication and, more particularly, to a method and apparatus for registering an access point through a WiFi network using information obtained from a common device in a cellular-WiFi convergence system.

Related Art

With the advent of ubiquitous environments, demand for receiving a seamless service, at any time and any place, by using a device, is increasing rapidly. The next-generation communication system can utilize a plurality of radio access technologies (RATs) to make the communication system accessible at any time and any place and to provide efficient performance. Examples of RAT for the next-generation communication system include, for instance, the $3^{rd}$ generation partnership project (3GPP) long-term evolution (LTE), 3GPP LTE-Advanced, IEEE (Institute of Electrical and Electronics Engineers) 802.11 (Wi-Fi), and IEEE 802.16 (WiMax, WiBro).

The next-generation communication system can integrate a plurality of RATs. Each individual entity of a plurality of RATs constituting the next generation communication system can exchange information with each other and accordingly provide an optimized communication system for the user of the next-generation communication system. A specific RAT among the plurality of RATs constituting the next-generation communication system can operate as a main RAT system while the other RATs can operate as sub-RAT systems. In other words, the main RAT system mostly provides communication services for the user of the next-generation communication system, while the sub-RAT systems play the tole of supporting the main RAT system. In most cases, a cellular system of the 3GPP LTE(-A) or the IEEE 802.16 providing comparatively large communication coverage acts as the main RAT system, whereas a Wi-Fi system providing relatively small coverage can act as the sub-RAT system.

In the next-generation communication system comprising a plurality of RATs, a main RAT system needs to know the entities of sub-RAT systems operating within the coverage of the communication system. For example, in case the main RAT system is a cellular system and the sub-RAT system is a Wi-Fi system, a cellular node, which can be a cellular base station or a cellular controller, needs to know what access points (APs) are present within its communication coverage.

Therefore, there needs a method for forming an optimal communication system where sub-RAT system entities inform a managing device (for example, a managing server, a cellular node, a cellular base station, or a cellular controller) of their information so that a main RAT system can efficiently obtain information of the sub-RAT system entities operating within coverage of the main RAT system.

Also, there needs a method for the second RAT system entities to obtain information of the main RAT system in a more efficient manner.

SUMMARY OF THE INVENTION

The present invention provides a method and apparatus for registering an access point through a Wi-Fi network by using information obtained from a common device in a wireless communication system. The present invention provides a method for registering an access point through a Wi-Fi network by using information obtained from a common device in a wireless communication system incorporating a cellular system and a Wi-Fi system. Also, the present invention provides an optimized method for a sub-RAT system entity to obtain information of a main RAT system information through a Wi-Fi network associated with a common device and to inform a managing device of the sub-RAT system information through the Wi-Fi network based on the obtained information.

The technology described below can be applied to various kinds of wireless communication systems employing code division multiple access (CDMA), frequency division multiple access (FDMA), time division multiple access (TDMA), orthogonal frequency division multiple access (OFDMA), or single carrier frequency division multiple access (SC-FDMA). CDMA can be implemented by a radio technology such as universal terrestrial radio access (UTRA) or CDMA2000. TDMA can be implemented by a radio technology such as global system for mobile communications (GSM), general packet radio service (GPRS), or enhanced data rates for GSM evolution (EDGE). OFDMA can be implemented by a radio technology such as IEEE (institute of electrical and electronics engineers) 802.11 (Wi-Fi), IEEE 802.16 (WiMAX), IEEE 802-20, or evolved UTRA (E-UTRA). The IEEE 802.16m is an evolved version of the IEEE 802.16e, providing backward compatibility with systems based on the IEEE 802.16e. UTRA is part of universal mobile telecommunications system (UMTS). The 3GPP LTE is part of the E-UMTS (evolved UMTS) which uses evolved UMTS terrestrial radio access (E-UTRA), employing OFDMA for downlink transmission and SC-FDMA for uplink transmission. The LTE-A is an evolved version of the 3GPP LTE.

For the purpose of clarity, this document is limited to the descriptions based on the 3GPP LTE(-A) and the IEEE 802.11, but the technical principles of the present invention are not limited to the aforementioned radio technologies.

DESCRIPTION OF EXEMPLARY EMBODIMENTS

Figure 1:
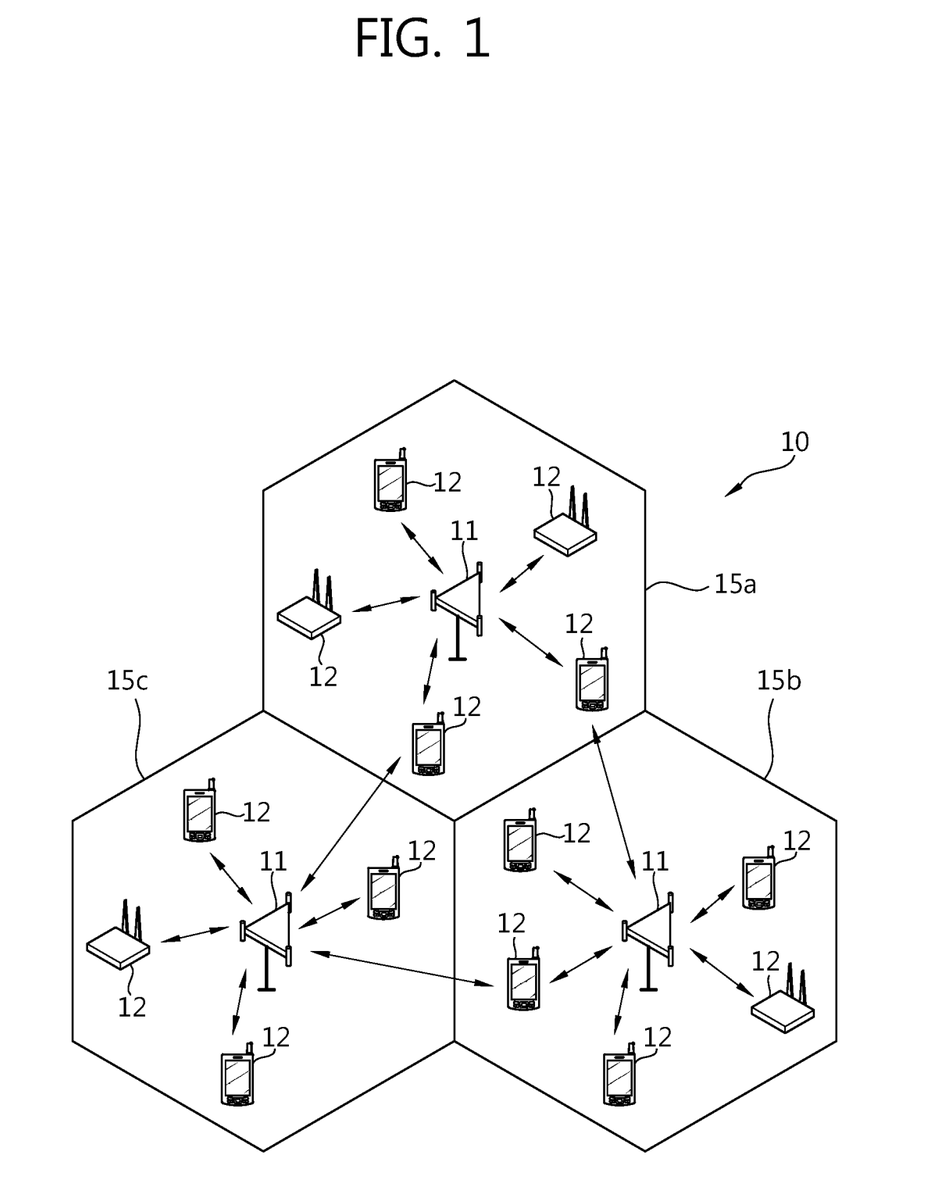
FIG. 1 illustrates a cellular system.

FIG. 1 illustrates a cellular system. The cellular system 10 includes at least one base station (BS) 11. Each base station provides communication services for a specific geographic region (which is usually called a cell) 15a, 15b, 15c. A cell can be further subdivided into multiple regions (which are called sectors). A user equipment (UE) 12 may be fixed or mobile and may be referred to as another terminology such as a mobile station (MS), a user terminal (UT), a subscriber station (SS), a wireless device, a personal digital assistant (PDA), a wireless modem, and a handheld device. The BS 11 usually refers to a fixed station that communicates with the UE 10 and may be referred to as another terminology such as an evolved node-B (eNB), a base transceiver system (BTS), and an access point.

In most cases, a UE belongs to one cell, and the cell to which the UE belongs is called a serving cell. A base station providing a communication service with respect to a serving cell is called a serving BS. A serving cell has neighboring cells. Those cells adjacent to a serving cell are called neighbor cells. A BS providing a communication service with respect to a neighbor cell is called a neighbor BS. A serving cell and a neighbor cell are determined relatively with respect to a UE.

The present invention can be applied to downlink (DL) and uplink (UL) transmission. In general, downlink transmission refers to communication from a BS 11 to a UE 12, whereas uplink transmission refers to communication from a UE 12 to a BS 11. In downlink transmission, a transmitter is part of the BS 11, and a receiver is part of the UE 12. In uplink transmission, a transmitter is part of the UE 12, whereas a receiver is part of the BS 11.

Figure 2:
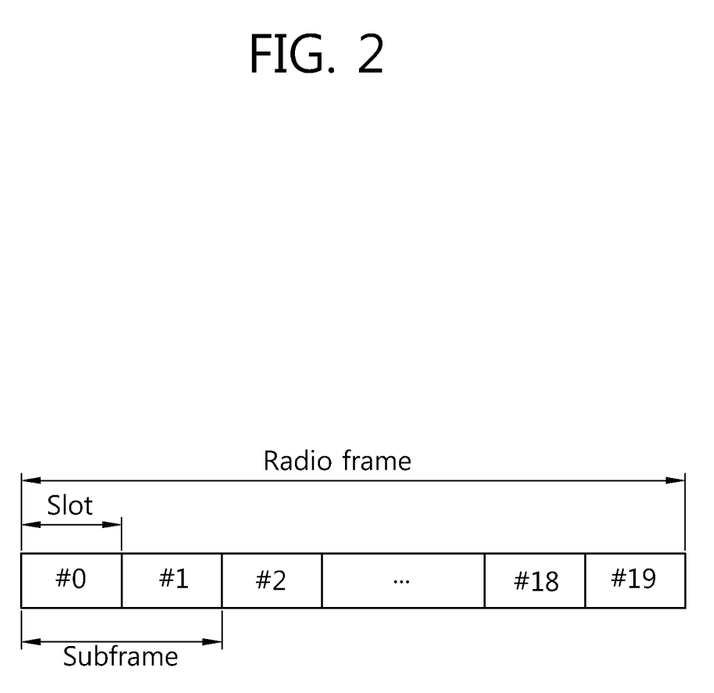
FIG. 2 illustrates a structure of a radio frame defined in the 3GPP LTE.

FIG. 2 illustrates a structure of a radio frame defined in the 3GPP LTE.

The radio frame structure can refer to Clause 4 of the 3GPP (3rd Generation Partnership Project) TS 36.211 V8.2.0 (2008-03). Referring to FIG. 2, a radio frame consists of 10 subframe, and one subframe consists of 2 slots. A slot number ranging from 0 to 19 is assigned to each individual slot within a radio frame. A transmission time interval (TTI) is a basic scheduling unit for data transmission. In the 3GPP LTE system, one TTI can equal the time period during which one subframe is transmitted. Length of one radio frame is 10 ms, length of one subframe is 1 ms, and length of one slot is 0.5 ms.

One slot includes a plurality of orthogonal frequency division multiplexing (OFDM) symbols in the time domain and a plurality of subcarriers in the frequency domain. An OFDM symbol is used to represent a symbol period since the 3GPP LTE employs OFDMA for downlink transmission, which can be called differently according to a multiple access method. For example, in case SC-FDMA is used for a uplink multiple access method, the OFDM symbol can be regarded as an SC-FDMA symbol. A resource block (RB) is a unit for allocating resources and includes a plurality of consecutive subcarriers within one slot. The radio frame structure is only an example. Therefore, the number of subframes included in a radio frame, the number of slots included in a subframe, or the number of OFDM symbols included in a slot can be changed in various ways.

The 3GPP LTE standard defines 7 OFDM symbols for one slot in the case of a normal cyclic prefix (CP) while 6 OFDM symbols are defined for one slot in the case of an extended CP.

Figure 3:
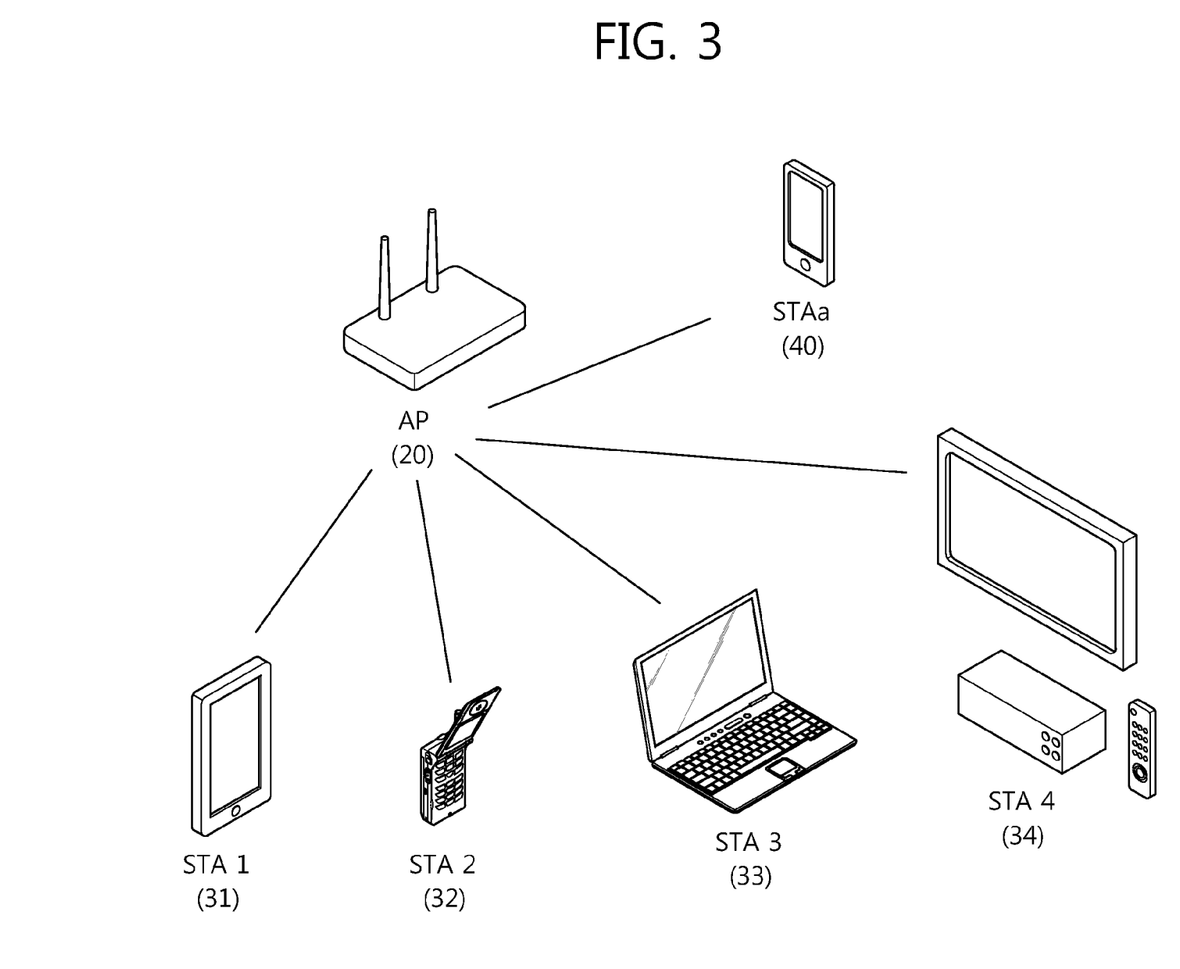
FIG. 3 illustrates a wireless local area network (WLAN) system.

FIG. 3 illustrates a wireless local area network (WLAN) system.

A WLAN system can be called a Wi-Fi system. With reference to FIG. 3, a WLAN system comprises one AP 20 and a plurality of stations (STAs) 31, 32, 33, 34, 40. The AP 20 can communicate with each STA 31, 32, 33, 34, 40. The WLAN system includes one or more basic service sets (BSSs). A BSS is a set of STAs that can communicate to each other as they are synchronized successfully with each other, but does not indicate a specific region.

An infrastructure BSS includes one or more non-AP STAs, an AP providing a distribution service, and a distribution system (DS) connecting a plurality of APs. In the infrastructure BSS, an AP manages non-AP STAs of a BSS. Therefore, it can be regarded that the WLAN system of FIG. 3 includes an infrastructure BSS. On the other hand, an independent BSS (IBSS) is a BSS operating in an ad-hoc mode. Since an IBSS does not include an AP, there is no centralized management entity which carries out a management function. In other words, in the IBSS, non-AP STAs are managed in a distributed manner. In the IBSS, since all of the STAs can be realized as mobile STAs and access to a distributed system is not allowed, the STAs form a self-contained network.

An STA is an arbitrary functional medium including media access control (MAC) compliant with the IEEE 802.11 standard and a physical layer interface with respect to a radio medium; and includes both AP and non-AP station in a broader sense.

A non-AP STA can also be called a mobile terminal, a wireless device, a wireless transmit/receive unit (WTRU), a user equipment (UE), a mobile station (MS), a mobile subscriber unit, or simply a user. In what follows, for the convenience of descriptions, a non-AP STA is referred to as an STA.

An AP is a functional entity providing connectivity with respect to a distributed system via a radio medium for an STA associated with the corresponding AP. In an infrastructure BSS including an AP, it is required that communication among STAs should be carried out through the AP; however, in case a direct link is available, STAs can communicate directly to each other. An AP may be called a central controller, a base station (BS), NodeB, a base transceiver system (BTS), or a site controller.

A plurality of infrastructure BSSs can be connected to each other through a distributed system. A plurality of BSSs connected to each other through a distributed system is called an extended service set (ESS). APs and/or STAs included in an ESS can communicate to each other, and an STA can move from one BSS to another while communicating continuously within the same ESS.

Figure 4:
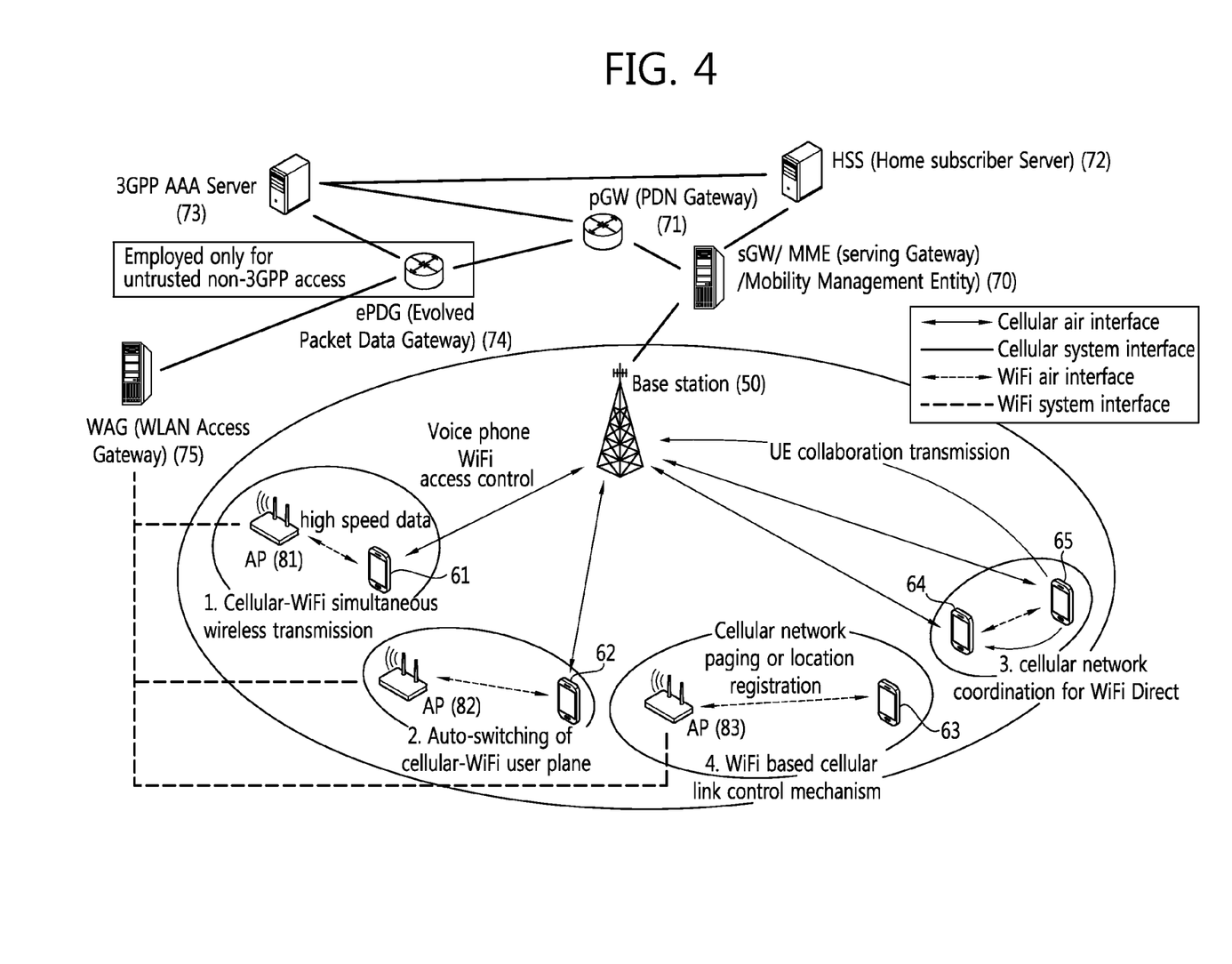
FIG. 4 is one example of a scenario for a cellular-WiFi convergence system.

FIG. 4 is one example of a scenario for a cellular-WiFi convergence system.

In the example of FIG. 4, a cellular system operates as a main RAT system of a convergence communication system, while a Wi-FI system operates as a sub-RAT system. It is further assumed that the cellular system of FIG. 4 employs the 3GPP LTE(-A). In what follows, for the purpose of convenience, it is assumed that the main RAT system of a convergence communication system is a 3GPP LTE(-A) system and the sub-RAT system of the convergence communication system is the IEEE 802.11 system, namely, a Wi-Fi system. However, embodiments of the present invention described below are not limited to the assumption above.

With reference to FIG. 4, a plurality of common devices 61, 62, 63, 64, 65 are present within coverage of a cellular base station 50. Each of the common devices 61, 62, 63, 64, 65 may be a user equipment of the cellular system. The cellular base station 50 can communicate with each of the common devices 61, 62, 63, 64, 65 through a cellular radio interface. For example, the cellular base station 50 can carry out voice communication with each of the common devices 61, 62, 63, 64, 65 or control connection of the common devices 61, 62, 63, 64, 65 to a Wi-Fi system.

The cellular base station 50 is connected to a serving gateway (S-GW)/mobility management entity (MME) 70 through a cellular system interface. An MME has connection information or capability information of UEs, and such information can be used for mobility management of UEs. The MME provides functions of control plane. The S-GW is a gateway having an E-UTRAN as an ending node. The S-GW provides functions of user plane. Also, the S-GW/MME 70 is connected to a packet data network (PDN) gateway (P-GW) 71 and a home subscriber server (HSS) 72 through the cellular system interface. The PDN-GW is a gateway having a PDN as an ending node.

Also, the P-GW 71 and the HSS 72 are connected to a 3GPP access authentication authorization (AAA) server 73 through the cellular system interface. The P-GW 71 and the 3GPP AAA server 73 can be connected to an evolved packet data gateway (e-PDG) 74 through the cellular system interface. The e-PDG 74 can be employed only for unauthorized, non-3GPP connection. The WAG 75 can be used as a P-GW in a Wi-Fi system.

Meanwhile, a plurality of APs 81, 82, 83 can be present within coverage of the cellular base station 50. Each of the APs 81, 82, 83 has coverage smaller than that of the cellular base station 50. Each of the APs 81, 82, 83 can communicate with common devices 61, 62, 63 within its coverage through a Wi-Fi radio interface. In other words, the common devices 61, 62, 63 can communicate with the cellular base station 50 and/or the APs 81, 82, 83. A communication method for the common devices 61, 62, 63 is as follows.

1) Cellular/Wi-Fi simultaneous wireless transmission: a common device 61 can carry out high speed data communication with an AP 81 through the Wi-Fi radio interface while carrying out communication with the cellular base station 50 through the cellular radio interface.

2) Auto-switching of cellular/Wi-Fi user plane: a common device 62 can communicate with either the cellular base station 50 or the AP 82 by auto-switching of user plane. At this time, control plane may be defined either for both of the cellular system and the Wi-Fi system or only for the Wi-Fi system.

3) Wi-Fi based cellular link control mechanism: An AP 83 can carry out a cellular link control mechanism such as network paging or registration of location with respect to a common device 63. The common device 63 is not directly connected to the base station 50, but can communicate with the cellular base station 50 indirectly through the AP 83.

4) UE collaboration transmission: a common device 64 operating as a source device may communicate directly with the cellular base station 50 through a cellular radio interface or communicate with the cellular base station 50 indirectly through a common device 65 operating as a collaboration device. In other words, a collaboration device 65 can support a source device 64 so that the source device 64 can communicate indirectly with the cellular base station 50 through the source device 64. The source device 64 and the collaboration device 65 communicate with each other through a Wi-Fi radio interface.

Each AP 81, 82, 83 is connected to a WAG 75 through a Wi-Fi system interface.

In what follows, described will be a procedure to obtain main RAT system information by using a common device according to the present invention.

A cellular system can be a main RAT system in a convergence communication system, while a Wi-Fi system can be a sub-RAT system in the convergence communication system. As described above, the cellular system needs to know which Wi-Fi system entity is operating within its coverage. Accordingly, a Wi-Fi system entity can inform a managing server or a cellular node (for example, a cellular base station or a cellular controller) of its information. At this time, the sub-RAT system entity needs to obtain the main RAT system information; the present invention enables the sub-RAT system entity to obtain main RAT system information from a common device through a Wi-Fi network and based on the obtained information, optimizes a procedure of informing a managing device of the sub-RAT system information through the WiFi network.

In the description above, the managing server may be a device which provides a generic advertisement service (GAS) based on an access network query protocol (ANQP). ANQP is a query protocol for retrieval of access network information carried by a GAS public action frame. GAS provides a function supporting an STA to determine availability of information related to a desired network service. Information related to the desired network service may be the information about an IBSS, a local access service, or a subscription service provider (SSP) and/or a service provided by a subscription service provider network (SSPN) or other external network. GAS can use a generic container for advertising information of a network service through an IEEE 802.11 network. A public action frame can be used to deliver such information. In an infrastructure BSS, before being connected to a wireless LAN system, STAs need to request information about a network service provided by an SSPN or another external network beyond an AP. Information exchange can be carried out after STAs are connected to a BSS.

In the description above, a managing server may be a device providing an access network discovery and selection function (ANDSF).

In what follows, it is assumed that a cellular system based on the 3GPP LTE(-A) is the main RAT system while a Wi-Fi system is a sub-RAT system; however, the present invention is not limited to the aforementioned assumption. Also, it is assumed that a sub-RAT system entity is an AP of a Wi-Fi system; the present invention is not limited to the assumption, either.

Figure 5:
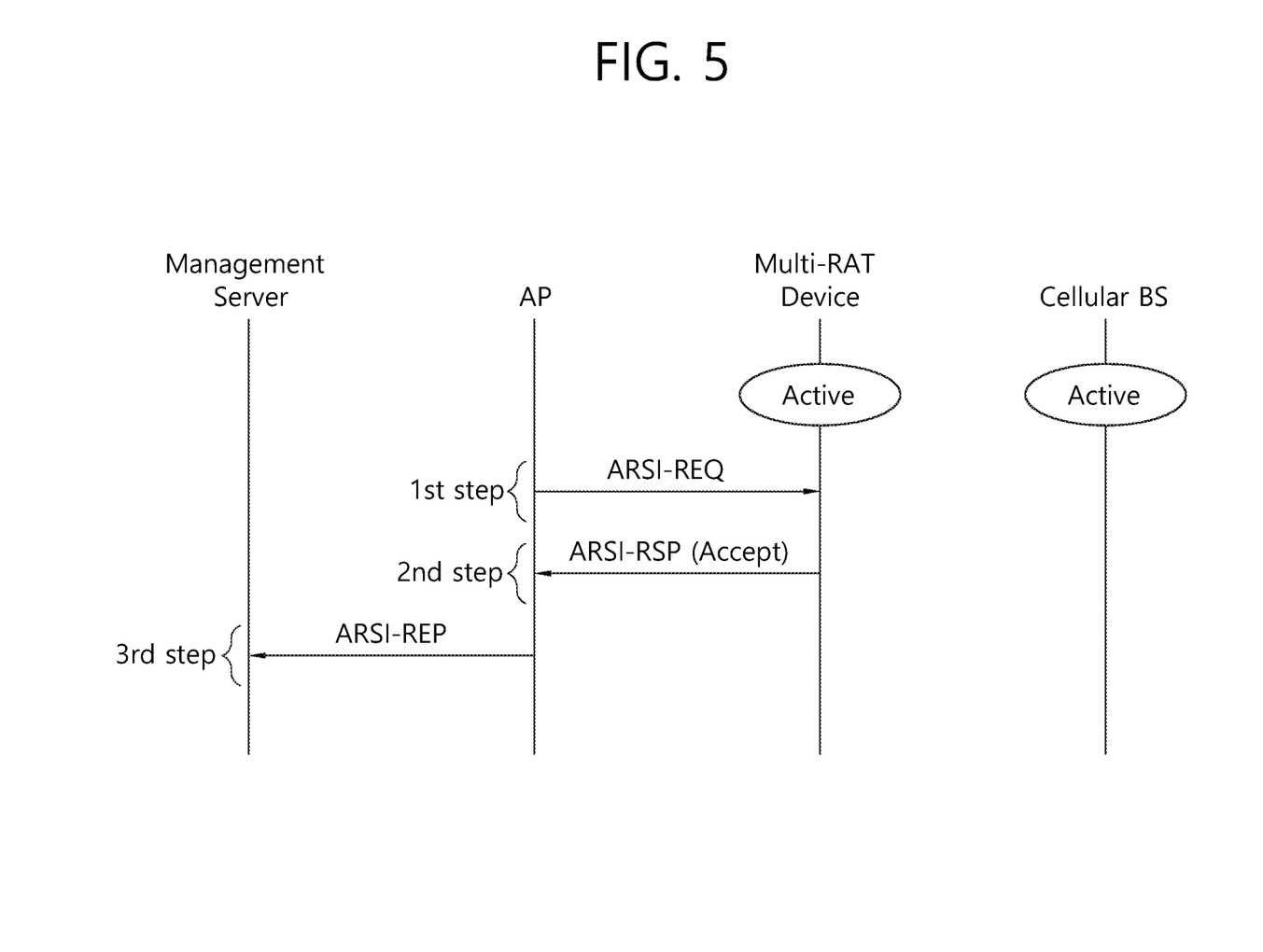
FIG. 5 illustrates a method for obtaining main RAT system information by using a common device when the common device belonging to the main RAT system is in an active mode.

FIG. 5 illustrates a method for obtaining main RAT system information by using a common device when the common device belonging to the main RAT system is in an active mode. In other words, FIG. 5 illustrates a method for obtaining the main RAT system information when a common device belonging to the main RAT system (for example, the cellular system) is in the active mode.

Figure 6:
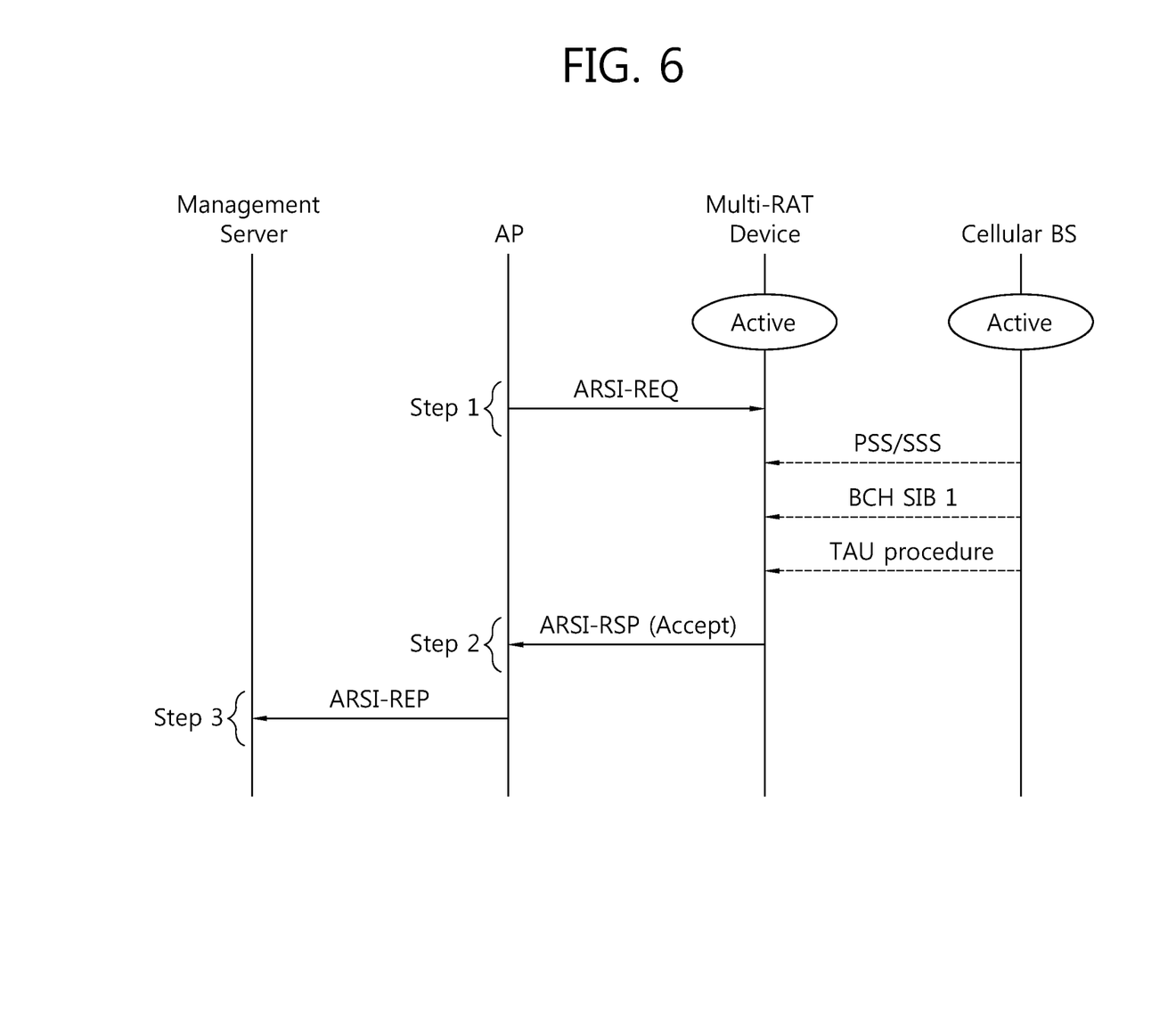
FIG. 6 illustrates one example of a procedure of obtaining main RAT system information by using a common device when the common device belonging to the main RAT system is in an idle mode according to the present invention.

FIG. 6 illustrates one example of a procedure of obtaining main RAT system information by using a common device when the common device belonging to the main RAT system is in an idle mode according to the present invention.

In other words, FIG. 6 illustrates a method for obtaining main RAT system information by using a common device when the common device belonging to the main RAT system is in an idle mode. In other words, FIG. 6 illustrates a method for obtaining main RAT system information when a common device belonging to the main RAT system (for example, cellular system) is in an idle mode.

In what follows, individual steps of FIGS. 5 and 6 illustrating a procedure of obtaining main RAT system information by using a common device according to the present invention will be described in detail.

In the first step, a sub-RAT system entity (for example, an AP) requests main RAT system (for example, cellular system) information from a common device through a WiFi air link. At this time, the request for the main RAT system information can be carried out by transmitting a particular request message to the common device, and the particular request message can be called an advanced main RAT system information request (ARSI-REQ). At this time, the AP can select one or more common devices from among all of the common devices associated with the AP through the Wi-Fi air link and transmit the request message to the selected common devices. The reason why multiple common devices are selected and the request message is transmitted thereto is that the transmission needs to take account of a hierarchical network structure. At this time, a management frame for the main RAT system information request message can have the same structure as the existing IEEE 802.11 management MAC frame.

In what follows, the IEEE 802.11 management MAC frame will be described.

Figure 7:
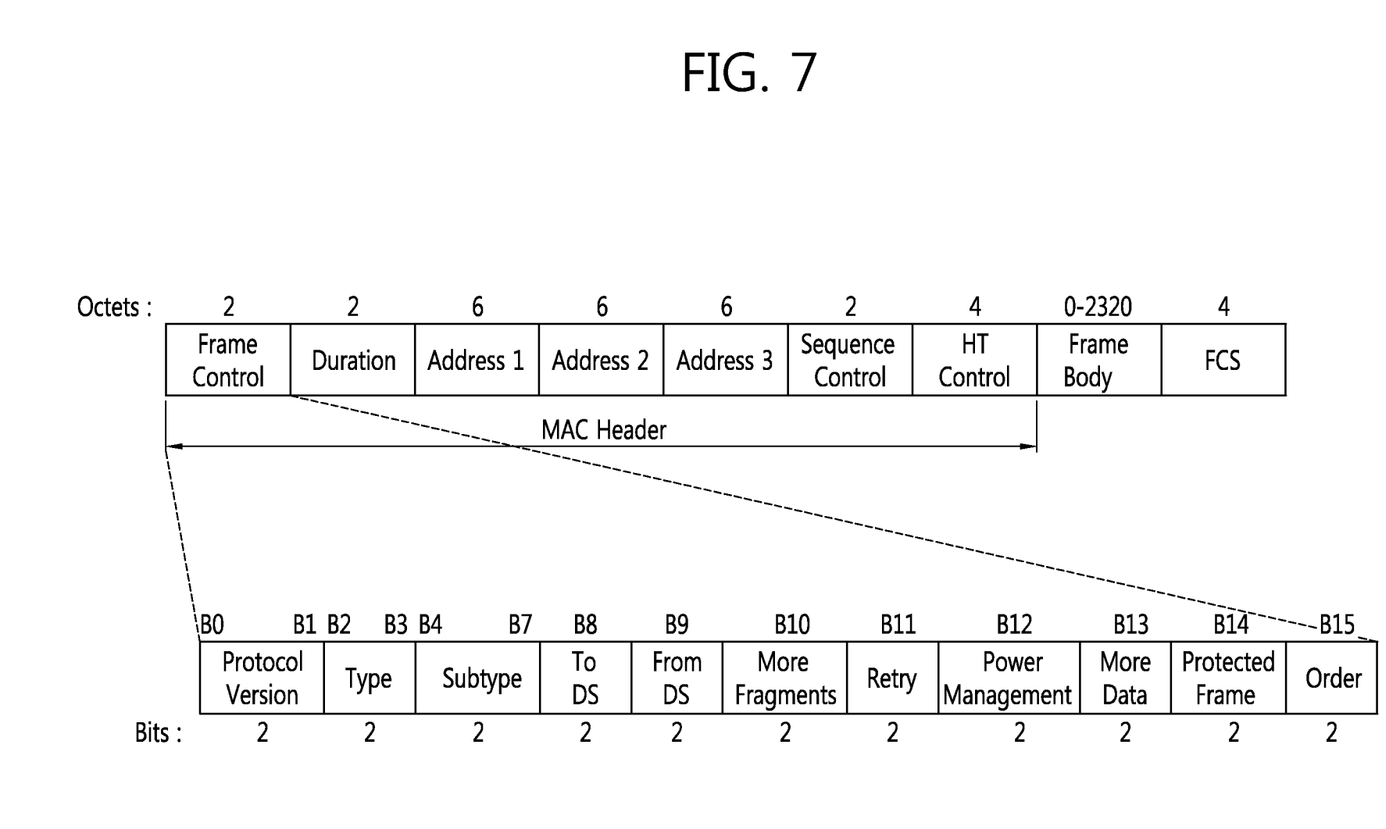
FIG. 7 illustrates a block diagram of a MAC frame format provided by a wireless LAN system.

FIG. 7 illustrates a block diagram of a MAC frame format provided by a wireless LAN system.

With reference to FIG. 7, a MAC frame can comprise a frame control field, a duration field, an address 1 field, an address 2 field, an address 3 field, a sequence control field, an HT control field, a frame body, and a frame check sequence (FCS) field.

At this time, the frame control field includes information about frame characteristics. The duration field can be implemented so that it can have a different value according to a frame type and a sub-type. The address 1 field to the address 3 field can be configured to implement particular fields from among a basic service set identifier (BSSID) field which indicates a BSSID, a source address (SA) field which indicates an SA, a destination address (DA) field which indicates a DA, a transmitting address (TA) field which indicates a transmitting STA address, and a receiving address (RA) field which indicates a receiver STA address. The sequence control field is configured to include a sequence number and a fragment number. A sequence number can specify a sequence number assigned to the frame. A fragment number can specify the number of each fragment of the frame. The HT control field includes control information related to a high throughput (HT) transmission and reception scheme and/or a very high throughput (VHT) transmission and reception scheme. The frame body field can include data that a transmitting STA and/or an AP attempts to transmit. The FCS field includes a bit sequence for CRC.

In what follows, the structure of the frame control field will be described in more detail.

As shown in FIG. 7, the frame control field includes a protocol version subfield, type subfield, subtype subfield, To-DS subfield, From-DS subfield, more fragment subfield, retry subfield, power management subfield, more data subfield, protected frame subfield, and order subfield. The protocol version subfield can be configured to specify the version of a wireless LAN protocol applied to the corresponding MAC frame. The type subfield and the subtype subfield can be configured to specify information for identifying a function of a frame including the corresponding frame control field. The To-DS subfield and the From-DS subfield can represent various types of data frames, management frames, and control frames by using various other values. The more fragment subfield can be configured to indicate existence of a fragment to be transmitted subsequent to the corresponding MAC frame. The retry subfield can be configured to indicate whether the corresponding MAC frame originates from re-transmission of a previous frame. The power management subfield can be configured to specify a power management mode of an STA. The more data subfield can be configured to indicate existence of a frame to be additionally transmitted. The protected frame subfield can be configured to include information indicating whether a frame body unit has been processed by an encryption encapsulation algorithm.

As described above, a management frame of the main RAT system information request message can have the same structure as that of the IEEE 802.11 management MAC frame. For example, the management frame can be defined as shown in Table 1 below so that the value of the type subfield and the value of the subtype subfield within the frame control field of the IEEE 802.11 management MAC frame can refer to the main RAT system information request message (for example, ARSI-REQ message).

TABLE 1

| Type value b3 b2 | Type description | Subtype value b7 b6 b5 b4 | Subtype description |
|---|---|---|---|
| 10 | Data | 1101 | Reserved |
| 10 | Data | 1101 | QoS CF-Poll(no data) |
| 10 | Data | 1111 | QoS CF-ACK + CF-Poll(no data) |
| 11 | Reserved | 0000-1111 | Reserved |

Type 0b11: Inter-RAT working management

Subtype 0b0000: Main RAT system information Request

In other words, reserved bit values within the type subfield and the subtype subfield can be used to refer to the main RAT system information request message (for example, ARSI-REQ message).

Also, various types of different parameters can be incorporated into the frame body field of the IEEE 802.11 management MAC frame to refer to the main RAT system information request message (for example, ARSI-REQ message). In other words, the following action codes can be included within the frame body field.

Action Code

Action code 1: accepts the corresponding information request only when the state of a common device belonging to the main RAT system is in "active mode".

Action code 2: accepts the corresponding information request irrespective of the state of a common device belonging to the main RAT system.

Action code 3: requests identification information of a network (for example, public land mobile network (PLMN)) of the main RAT system.

Action code 4: requests identification information of a BS controller (for example, mobility management entity) of the main RAT system.

Action code 5: requests identification information of a cell or a BS of the main RAT system. At this time, the BS includes all kinds of BSs, including macro BS, femto BS, pico BS, and so on.

Action code 6: requests position information (for example, coordinates) of a common device.

The action code can be realized in the form of a bitmap, and by using the action code, the AP may request a common device to perform a plurality of actions.

After the AP transmits the main RAT system information request message to a common device through a Wi-Fi air link, the common device, which receives the main RAT system information request message (for example, ARSI-REQ message), carries out an operation according to the state of the main RAT system and transmits a response message with respect to the main RAT system information request message as a second step. At this time, the response message with respect to the main RAT system information request message can be referred to as an advanced main RAT system information response (ARSI-RSP) message. At this time, the management frame of the response message can have the same structure as that of the existing IEEE 802.11 management MAC frame.

For example, the type subfield and the subtype field of the Table 1 can be defined as follows to indicate that the values of the type subfield and the subtype subfield within the frame control field of the IEEE 802.11 management MAC frame refer to a response message (for example, ARSI-RSP message) with respect to the main RAT system information request.

Type 0b11: Inter-RAT working management
Subtype 0b0001: Main RAT system information Response In other words, reserved bit values within the type subfield and the subtype subfield can be used to refer to a response message (for example, ARSI-RSP message) with respect to the main RAT system information request.

Also, various types of different parameters can be incorporated into the frame body field of the IEEE 802.11 management MAC frame to refer to a response message (for example, ARSI-REQ message) with respect to the main RAT system information request message.

For example, the following parameters can be incorporated into the frame body field.

Result: parameter showing the result with respect to an action requested by an AP (for example, Accept/Reject)
Reason: parameter illustrating an explanation for the result (for example, Not support/Not suitable)

In case the "Result" is "Accept", the corresponding parameter can be omitted or set to a random value.

The parameter value of "Not support" indicates that a common device is unable to carry out a request of the AP since the main RAT system or the common device is not allowed to transmit a result with respect to the corresponding action to another system.

The parameter value of "Not suitable" indicates that a common device is unable to carry out a request of the AP since the main RAT system is not in an appropriate state (for example, active mode).

Parameter as to whether to include an output: indicates whether to include an output with respect to each action
Output: result with respect to an action requested by the AP In the case of Action code 3, the identification information of a network of the main RAT system (for example, public land mobile network (PLMN)).

In the case of Action code 4, the identification information of a BS controller (for example, mobility management entity).

In the case of Action code 5, the identification information of a cell or a BS (refers to all kinds of BSs including macro BS, femto BS, and pico BS) of the main RAT system.

In the case of Action 6, the position information (for example, coordinates) of a common device.

In what follows, operation at the second step in case the state of a common device belonging to the main RAT system is an "active mode" will be described in detail.

First, it is assumed that the main RAT system or a common device is allowed to transmit a result with respect to the corresponding action to another system; in case the state of the common device is in an active mode, the common device can carry out the remaining, set actions irrespective of the set value of the action code 1 or 2 within the main RAT system information request message (for example, ARSI-REQ message).

In the case of action code 3, identification information of a network can be incorporated into the "Output" parameter within the response message (ARSI-RSP) frame. As one example, a common device can extract a mobile country code (MCC) and a mobile network code (MNC) within its international mobile subscriber identity (IMSI) or pre-obtained globally unique temporary identifier (GUTI); and a common device in the LTE system can obtain GUTI through an attach and a tracking area update (TAU) process.

Figure 8:
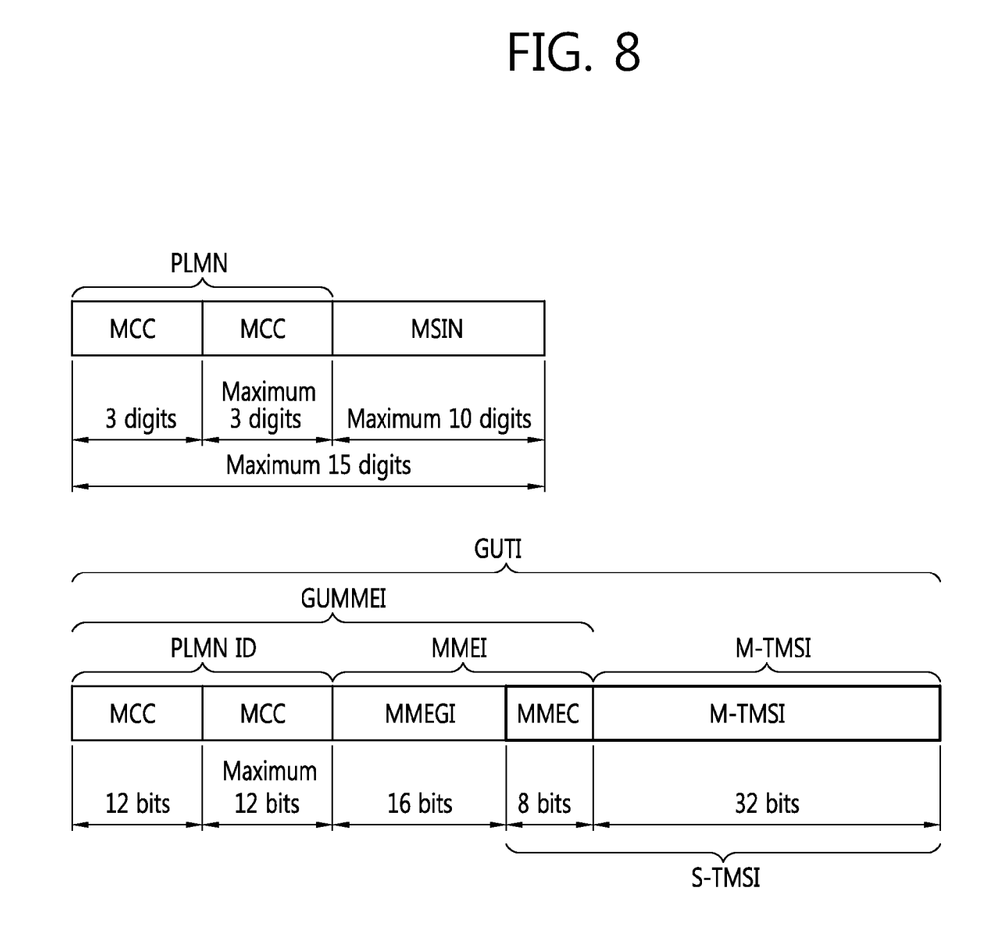
FIG. 8 illustrates structures of an international mobile subscriber identity (IMSI) and a globally unique temporary identifier (GUTI) according to the present invention.

FIG. 8 illustrates structures of an international mobile subscriber identity (IMSI) and a globally unique temporary identifier (GUTI) according to the present invention.

As shown in FIG. 8, in the case of action code 3, IMSI, or MCC and MNC within the pre-obtained GUTI can be extracted; and the identification information of a network can be incorporated into the "Output" parameter within the response message (ARSI-RSP) frame.

In the case of action code 4, identification information of a BS controller can be incorporated into the "Output" parameter within the response message (ARSI-RSP) frame. In one example, as shown in FIG. 8, a common device can extract an MME group identifier (MMEGI) and an MME code (MMEC) from the pre-obtained GUTI, and the identification information of the BS controller can be incorporated into the "Output" parameter within the response message (ARSI-RSP) frame.

In the case of action code 5, identification information of a cell or a BS can be incorporated into the "Output" parameter within the response message (ARSI-RSP) frame. As one example, a common device can receive a primary synchronization signal (PSS) and a secondary synchronization signal (SSS) and extract a physical cell ID (PCI) by using a pre-obtained physical layer identity and a cell group identity. Also, the common device can extract a cell identity (E-UTRAN cell identifier: eNB ID+PCI) within a previously received system information block type 1 through a broadcast channel. The identification information of a cell can be incorporated into the "Output" parameter within the response message (ARSI-RSP) frame. As one example, in case the main RAT system corresponds to the IEEE 802.16e, the common device can extract a BS ID within a previously received DL channel descriptor (DCD), while in case the main RAT system corresponds to the IEEE 802.16m, the common device can extract an ABS MAC ID within a previously received super frame header (SFH) sub-packet. The identification information of a BS can be incorporated into the "Output" parameter within the response message (ARSI-RSP) frame.

In the case of action code 6, position information of a common device can be incorporated into the "Output" parameter within the response message (ARSI-RSP) frame. As one example, a common device can recognize its position by using a method such as observed time difference of arrival (OTDOA), assisted global navigation satellite system (A-GNSS), or enhanced cell ID (E-CID), which is applied to the LTE positioning protocol (LPP); and the position information of the common device can be incorporated into the "Output" parameter within the response message (ARSI-RSP) frame.

In what follows, operation at the second step in case the state of a common device belonging to the main RAT system is not an "active mode", namely, when the state of the common device is an "idle mode" or an "only RRC-connected mode" will be described in detail.

First, it is assumed that the main RAT system or a common device is allowed to transmit a result with respect to the corresponding action to another system; if the action code within the main RAT system information request message (for example, ARSI-REQ message) is set to action code 1, the common device can change "Result" within the response message (ARSI-RSP) into "Reject" and "Reason" to "not suitable"; and the common device may not carry out the remaining, set actions.

However, in case the state of a common device belonging to the main RAT system is not an active mode and the action code within the main RAT system information request message (for example, ARSI-REQ message) is set to action code 2, the common device can carry out operations for the respective set actions as follows.

In the case of action code 3, identification information of a network can be incorporated into the "Output" parameter within the response message (ARSI-RSP) frame. As one example, a common device can extract the MCC and the MNC within the GUTI. Also, the common device may extract a Plmn-IdentityList within a system information block (SIB) type 1 received through a broadcast channel. At this time, if the state of the common device corresponds to an 'only RRC-connected', the common device may extract the Plmn-IdentityList within the pre-obtained SIB 1. The identification information of the extracted network can be incorporated into the "Output" parameter within the response message (ARSI-RSP) frame.

In the case of action code 4, identification information of a BS controller can be incorporated into the "Output" parameter within the response message (ARSI-RSP) frame. As one example, a common device can extract an MME group identifier (MMEGI) and an MME code (MMEC) within a globally unique temporary identifier (GUTI). At this time, in case the common device is not in the idle state (for example, Null) while incorporating the GUTI into the "Output" parameter within the response message (ARSI-RSP) frame, the common device obtains the GUTI by carrying out the attach process and incorporates the GUTI into the "Output" parameter within the response message (ARSI-RSP) frame. In case the common device is in the idle state, the common device first receives the BCH SIB type 1 and determines whether the TAU is requested. At this time, the common device can determine whether the TAU is requested by comparing a tracking area code (TAC) of a TA list maintained by the common device with the TAC of the SIB type 1. If it is found that the TAU is requested, the common device obtains a new GUTI through a TAU process, whereas if the TAU is not requested, the common device uses an existing GUTI. Also, the common device may set the "Result" within the response message (ARSI-RSP) to "Reject" or may not include the corresponding information without carrying out an additional operation such as a procedure for obtaining the GUTI or reception of BCH SIB type 1.

In the case of action code 5, identification information of a cell or a BS can be incorporated into the "Output" parameter within the response message (ARSI-RSP) frame. As one example, a common device has to receive a primary synchronization signal (PSS) and a secondary synchronization signal (SSS); and can extract a physical cell ID (PCI) by using the physical layer identity and the cell group identity obtained through the corresponding signal. Also, the common device can additionally extract the corresponding information within the system information block type 1 through a broadcast channel. At this time, if the state of the common device corresponds to the "only RRC-connected", the common device can also extract the corresponding information from pre-obtained synchronization information and the BCH SIB 1 information. The corresponding information extracted according to the process set forth above can be incorporated into the "Output" parameter within the response message (ARSI-RSP) frame. Also, as one example, in case the main RAT system corresponds to the IEEE 802.16e, the common device can extract a BS ID within a previously received DL channel descriptor (DCD), while in case the main RAT system corresponds to the IEEE 802.16m, the common device can extract an ABS MAC ID within a previously received super frame header (SFH) sub-packet. The identification information of a BS can be incorporated into the "Output" parameter within the response message (ARSI-RSP) frame. Also, while not carrying out the additional operation such as the synchronization process, the BCH SIB 1 reception process, the DCD reception process, and the SFH reception process, the common device may set the "Result" within the response message (ARSI-RSP) to "Reject" or may not include the corresponding information.

In the case of action code 6, position information of a common device can be incorporated into the "Output" parameter within the response message (ARSI-RSP) frame. As one example, a common device can recognize its position by changing its state into the active mode according to a method such as observed time difference of arrival (OTDOA), assisted global navigation satellite system (A-GNSS), or enhanced cell ID (E-CID), which is applied to the LTE positioning protocol (LPP); and the position information of the common device can be incorporated into the "Output" parameter within the response message (ARSI-RSP) frame. Also, the common device may set the "Result" within the response message (ARSI-RSP) to "Reject" without determining its position or may not include the corresponding information.

In what follows, described in detail will be the third step where the AP carries out an operation according to the "Result" parameter within the response message (ARSI-RSP) and reports to a managing device (for example, a managing server) about the carrying out the operation after receiving the ARSI-RSP. At this time, the main RAT system information report can be carried out by transmitting a particular report message to a managing server, and the particular report message can be called an advanced main RAT system information report (ARSI-REP) message.

In case the "Result" parameter within the response message is "Reject", the AP can carry out again the step of requesting the main RAT system information from a common device through a Wi-Fi air link, namely, the first step.

At this time, the AP does not transmit the request to the common device which has transmitted the "Reject".

In case the "Result" parameter within the response message (ARSI-RSP) is "Reject" and additional information is requested, the AP can carry out again the step of requesting the main RAT system information from a common device through a Wi-Fi air link, namely, the first step. Meanwhile, in case the "Result" parameter within the response message (ARSI-RSP) is "Accept", the AP can transmit the obtained "Output" parameter information to the AP information managing device (for example, WAG, managing server). At this time, if the position of the AP can be estimated based on the position information about the common device within the response message (ARSI-RSP), the AP can also transmit the estimated position information.

Also, the AP can transmit information related to itself such as an operating band, operating class, channel number, MAC address (for example, basic service set identifier (BSSID)), HESSID, SSID, and indicator as to whether the AP is available for all of the users or only for a limited number of users (for example, open subscriber group or closed subscriber group with password).

Also, a new entity (for example, dual-stack gateway, AP controller) can be added between the AP and an AP information managing device, and the corresponding entity can collect the information that each AP transmits and can transmit the collected information by modifying the transmission type. At this time, the AP or the corresponding entity can be previously aware of the information (for example, address) about the AP information managing device or can know the information from an authentication server through an authentication process.

Afterwards, the AP information managing device receives the ARSI-REP message and stores and manages parameter information within the ARSI-REP message. At this time, the information that the AP information managing device manages can include an MAC address of the AP (for example, BSSID), a network identifier of the main RAT system of which the coverage overlaps with that of the corresponding AP, an identifier of a BS controller of the main RAT system of which the coverage overlaps with that of the corresponding AP, an identifier of a cell or a BS of the main RAT system of which the coverage overlaps with that of the corresponding AP, position information of a common device connected to the corresponding AP, and position information of the corresponding AP.

Also, the information that the AP information managing device manages can include an AP's operating band, operating class, and channel number; the AP's MAC address (for example, basic service set identifier (BSSID)), HESSID, SSID; and indicator as to whether the AP is available for all of the users or only for a limited number of users (for example, open subscriber group or closed subscriber group with password).

Figure 9:
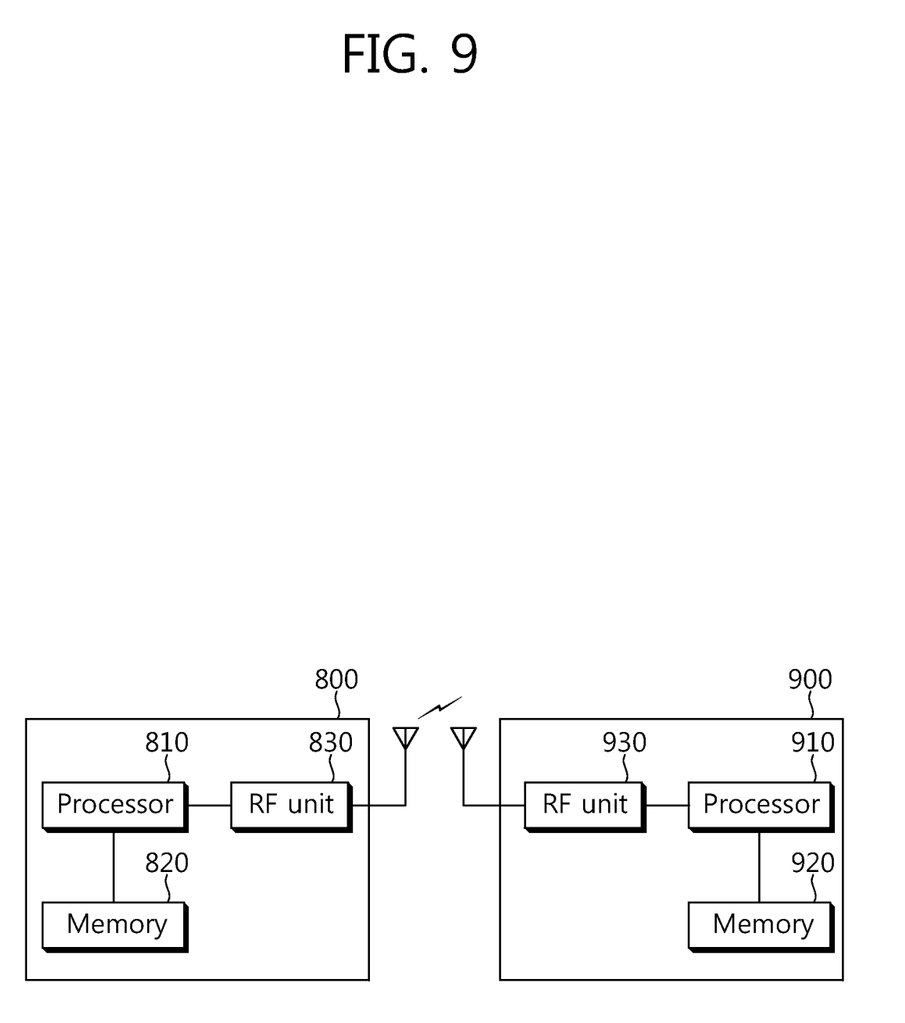
FIG. 9 is a block diagram of a wireless communication system to which an embodiment of the present invention is implemented.

FIG. 9 is a block diagram of a wireless communication system to which an embodiment of the present invention is implemented.

A cellular node 800 includes a processor 810, a memory 820, and a radio frequency (RF) unit 800. The processor 810 implements the proposed functions, processed, and/or methods. The processor 810 can implement layers of a radio interface protocol. The memory 820 is connected to the processor 810 and configured to store various information used for operating the processor 810. The RF unit 830 is connected to the processor 810 and configured to send and/or receive a radio signal.

A Wi-Fi entity or a common device 900 comprises a processor 910, a memory 920, and an RF unit 930. The processor 910 implements the proposed functions, processed, and/or methods. The processor 910 can implement layers of a radio interface protocol. The memory 920 is connected to the processor 910 and configured to store various information used for operating the processor 910. The RF unit 930 is connected to the processor 910 and configured to send and/or receive a radio signal.

The processor 810, 910 may include application-specific integrated circuits (ASICs), other chipsets, logic circuits, and/or data processors. The memory 820, 920 may include read-only memory (ROM), random access memory (RAM), flash memory, memory cards, storage media and/or other storage devices. The RF unit 830, 930 may include a baseband circuit for processing a radio signal. When the embodiment described above is implemented in software, the scheme described above may be implemented using a module (process or function) which performs the function described above. The module may be stored in the memory 820, 920 and executed by the processor 810, 910. The memory 820, 920 may be disposed inside or outside of the processor 810, 910 and connected to the processor 810, 910 using a variety of well-known means.

In the above exemplary systems, although the methods have been described based on the flow diagrams using a series of steps or blocks, the present invention is not limited to a particular order of the steps, and some of the steps may be performed in a different order from the remaining steps or may be performed simultaneously with the remaining steps. Furthermore, those skilled in the art will understand that the steps shown in the flow diagrams are not exclusive and may include other steps or one or more steps of the flow diagrams may be deleted without affecting the scope of the present invention.

The embodiments described above include various aspects of examples. Although it is not possible to describe all of the combinations of the examples to illustrate various aspects of the present invention, it will be understood by those skilled in the art that different combinations are possible. Therefore, it can be understood that the present invention includes all of the other substitutions, modifications, and changes belonging to the technical scope defined by the appended claims.

What is claimed is:

1. A method for obtaining information related to a cellular system in a wireless communication system, the method performed by an Access Point (AP) and comprising:
   transmitting a request message to a multi-radio access technology (RAT) device through a Wireless Local Area Network (WLAN) system network for requesting information related to the cellular system;
   receiving a response message from the multi-RAT device through the cellular system in response to the request message, the response message including the information related to the cellular system; and
   transmitting a report message including the information related to the cellular system to a managing server through the WLAN system network,
   wherein the request message is an advanced main RAT system information request (ARSI-REQ) message including a parameter representing an action code,
   wherein the action code is expressed in bitmap form and requests at least one of a plurality of actions,
   wherein the action code is used to perform at least accepting the request message only when a cellular device belonging to the cellular system is in an active mode, accepting the request message irrespective of a state of the cellular device, requesting identification information of a network of the cellular system, requesting identification information of a base station (BS) controller of the cellular system, requesting identification information of a cell or a BS of the cellular system, or requesting position information of the cellular device, and wherein the request message is transmitted using an IEEE 802.11 MAC frame format.

2. The method of claim 1, wherein the response message is an ARSI-RSP message.

3. The method of claim 1, wherein the report message further includes information related to the WLAN system in addition to the information related to the cellular system.

* * * * *